US006595662B2

United States Patent
Wardenburg

(10) Patent No.: US 6,595,662 B2
(45) Date of Patent: Jul. 22, 2003

(54) DOUBLE-WALLED GROW LIGHT HOUSING WITH AIR FLOW COOLING SYSTEM

(75) Inventor: Peter Wardenburg, Petaluma, CA (US)

(73) Assignee: Hydrofarm, Inc., Petaluma, CA (US)

( * ) Notice: Subject to any disclaimer, the term of this patent is extended or adjusted under 35 U.S.C. 154(b) by 0 days.

(21) Appl. No.: 09/823,087

(22) Filed: Mar. 29, 2001

(65) Prior Publication Data

US 2002/0141195 A1 Oct. 3, 2002

(51) Int. Cl.[7] ................................. B60Q 3/04
(52) U.S. Cl. .................. 362/362; 362/294; 362/264; 362/345; 362/373; 362/218
(58) Field of Search ................. 362/362, 294, 362/264, 345, 373, 218

(56) References Cited

U.S. PATENT DOCUMENTS

| 4,037,096 A | * | 7/1977 | Brendgord et al. | .......... 362/294 |
| 6,247,830 B1 | * | 6/2001 | Winnett et al. | .............. 313/11 |

* cited by examiner

Primary Examiner—Sandra O'Shea
Assistant Examiner—Bertrand Zeade
(74) Attorney, Agent, or Firm—Larry D. Johnson; Craig M. Stainbrook; Johnson & Stainbrook, LLP

(57) ABSTRACT

A grow light having an exterior shell with an air inlet and a hot air exhaust outlet, and a specular interior insertable into the shell. The sides of the specular insert are spaced apart from the walls of the shell so as to form a double-walled housing having air cooling chambers and vents which facilitate the movement and exhaust of air heated by high intensity light bulbs.

10 Claims, 10 Drawing Sheets

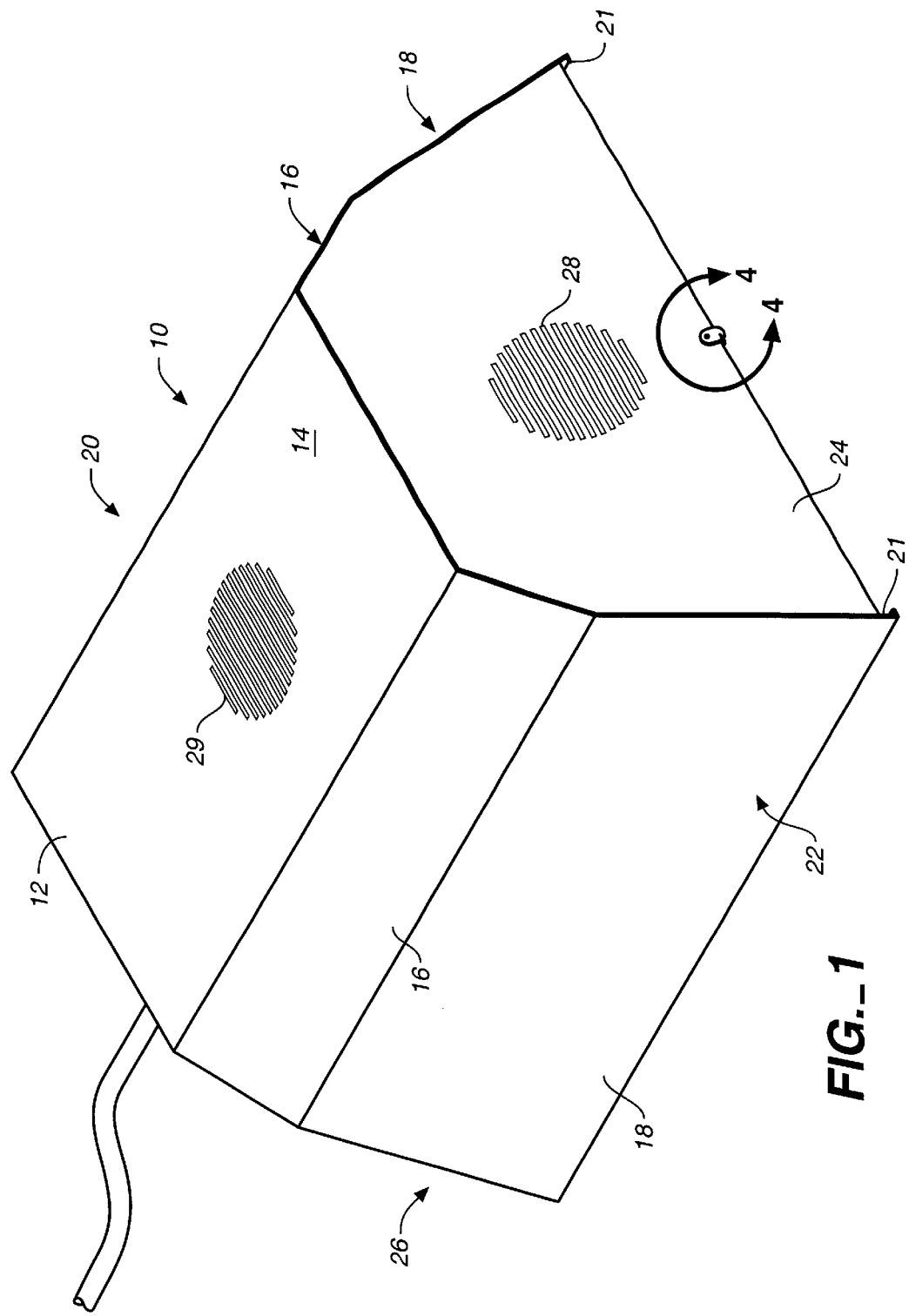
FIG._1

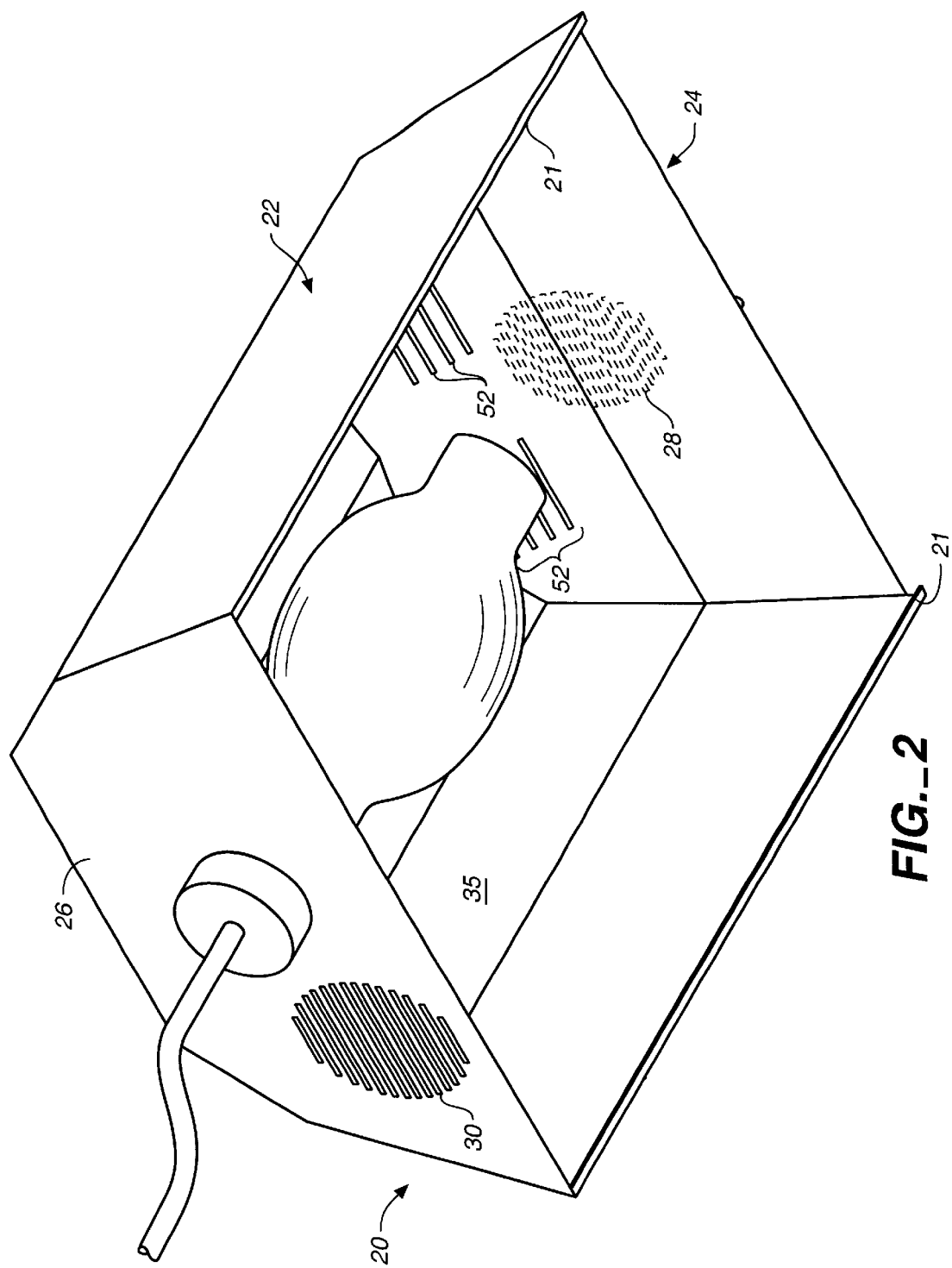
FIG._2

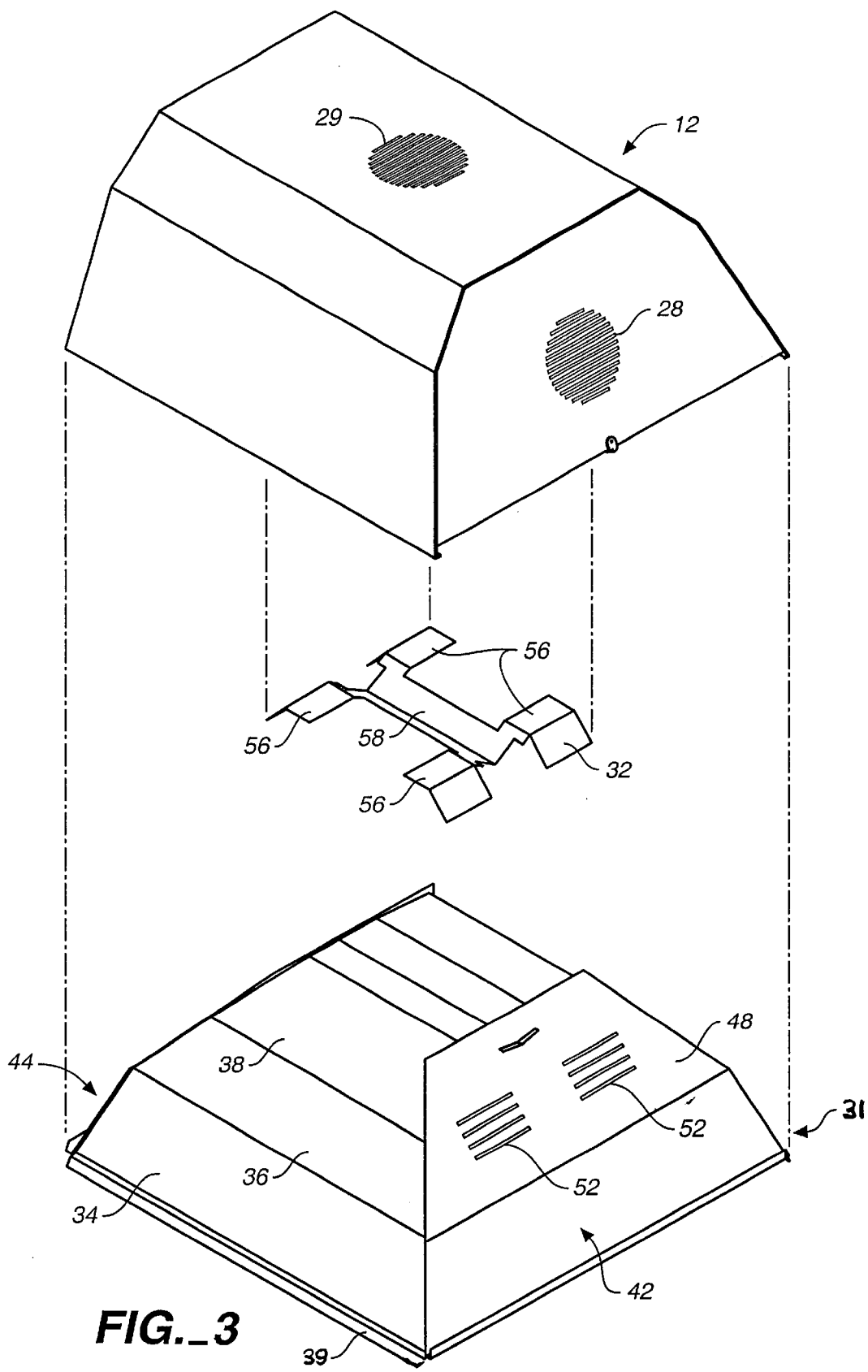
FIG._3

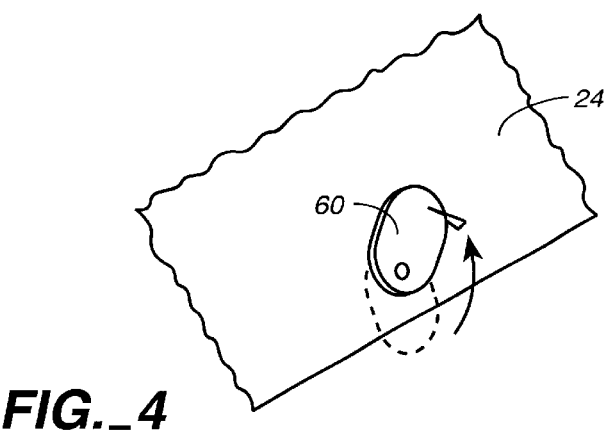
FIG._4
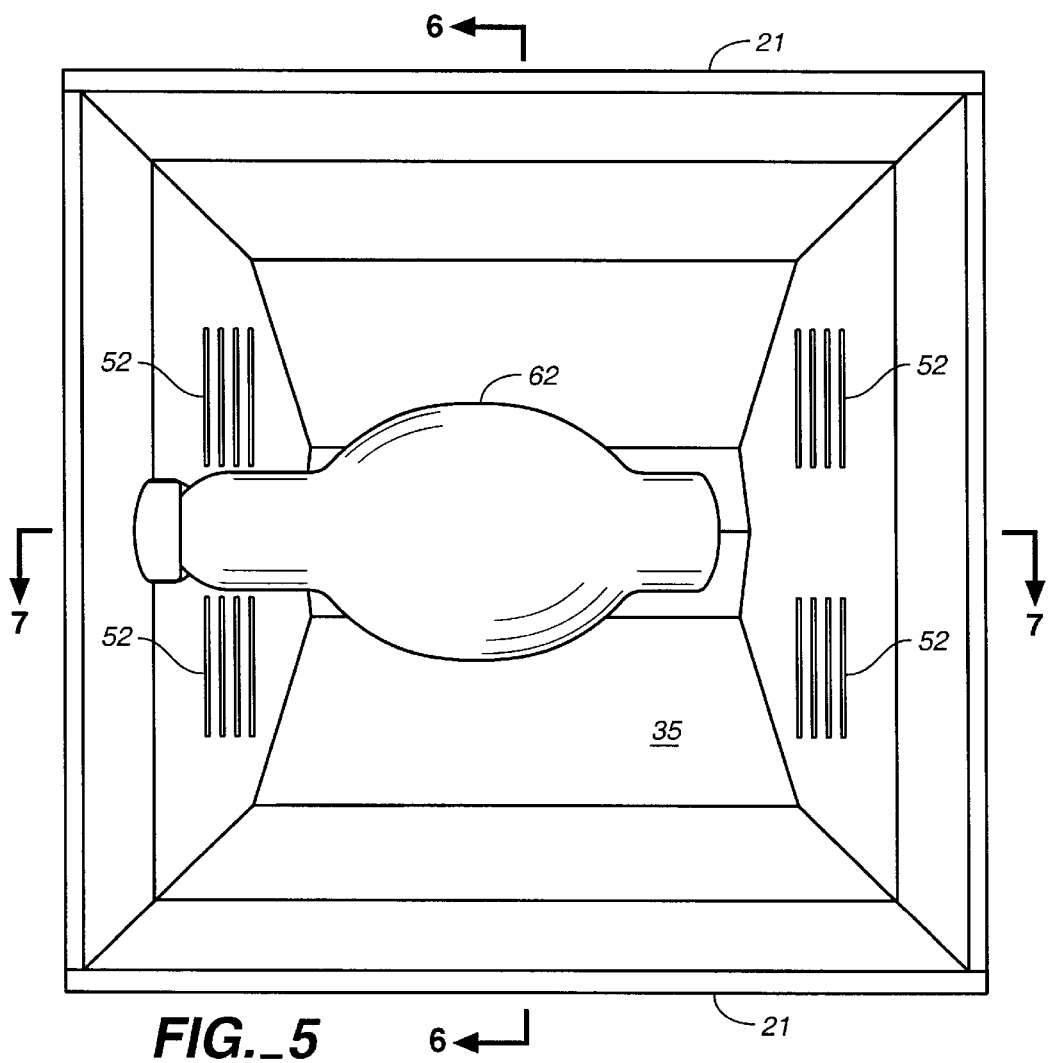
FIG._5

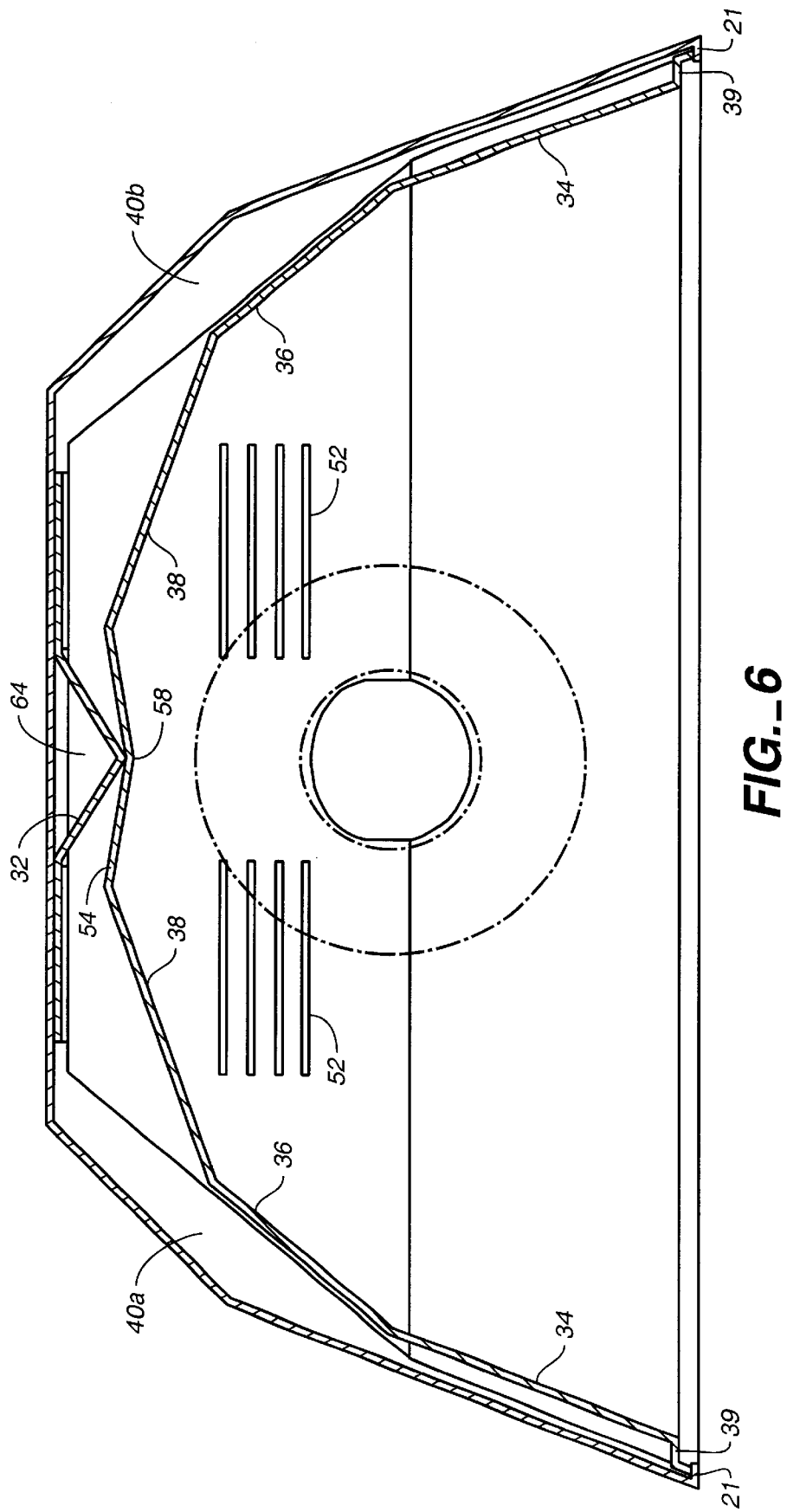
FIG._6

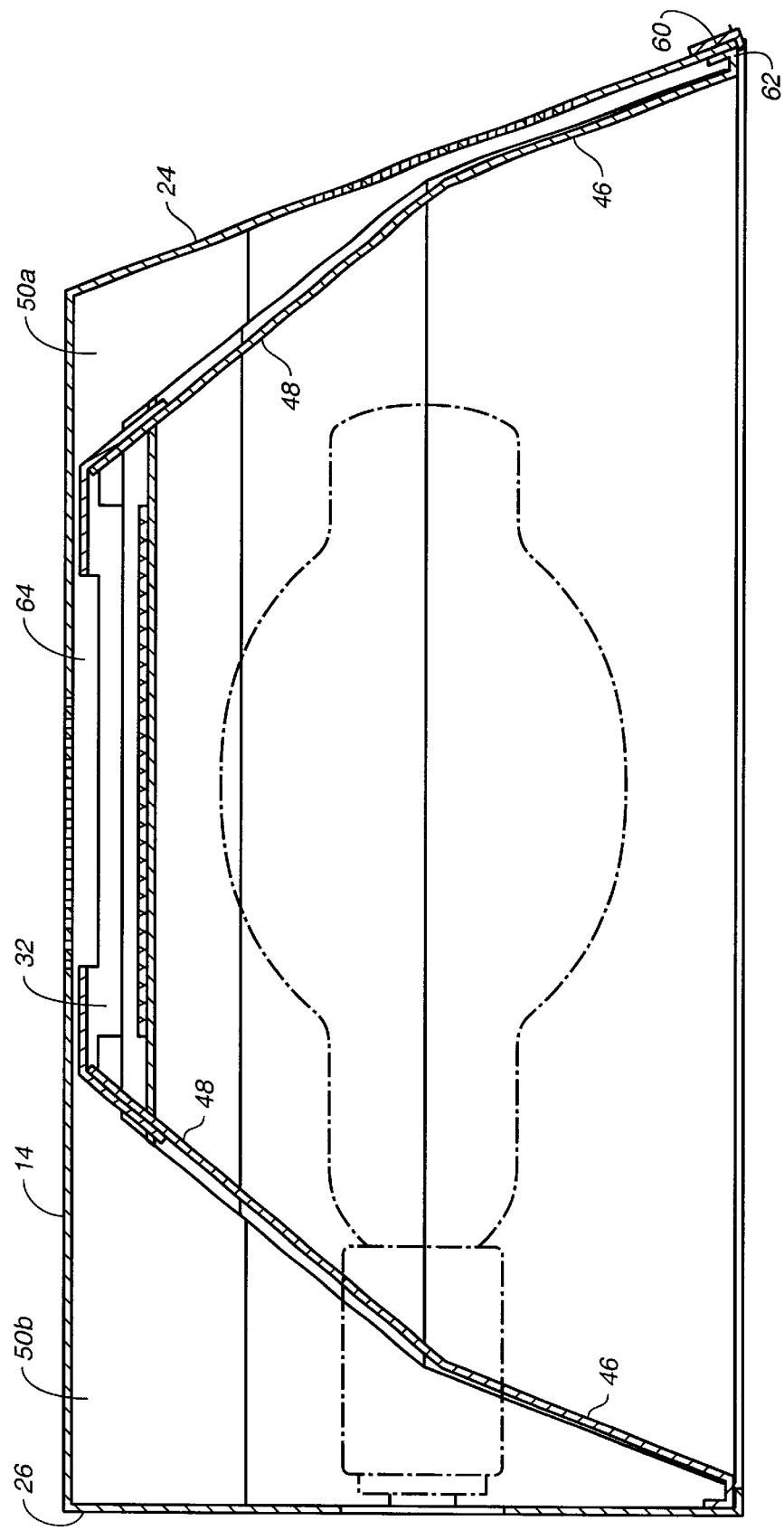
FIG._7

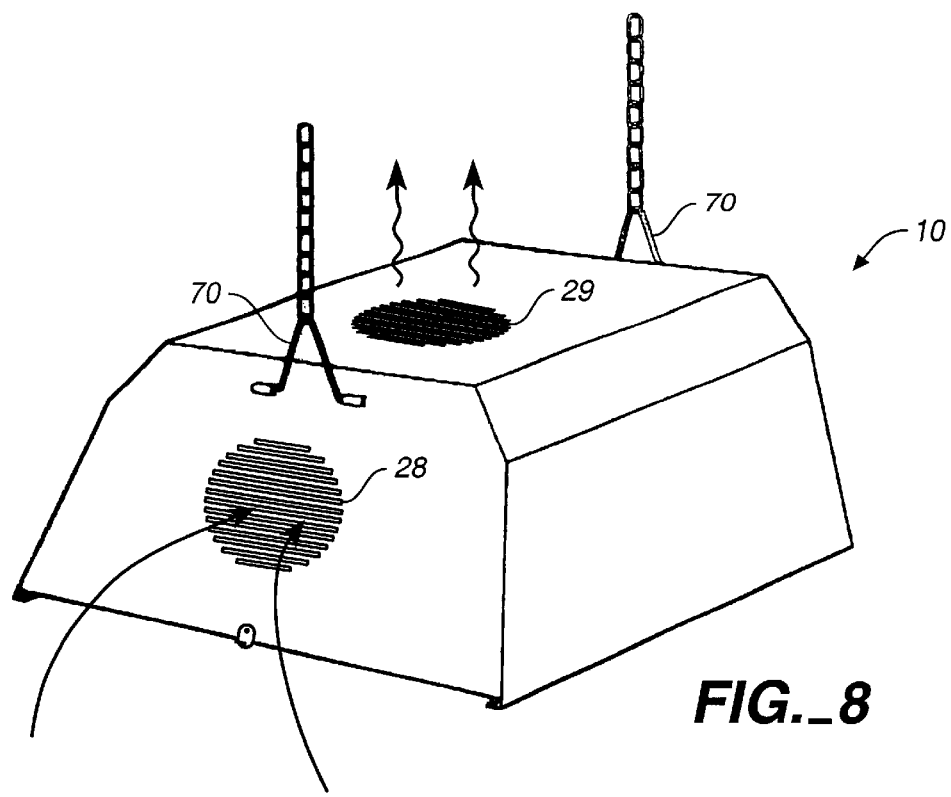
FIG._8
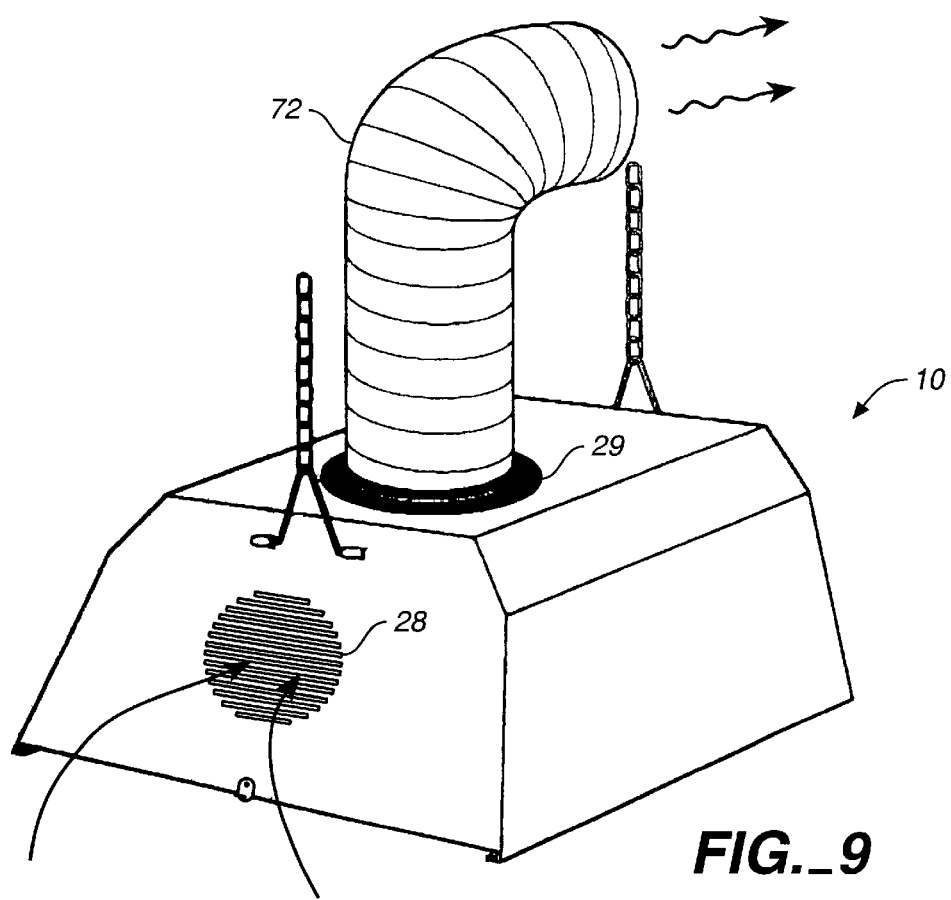
FIG._9

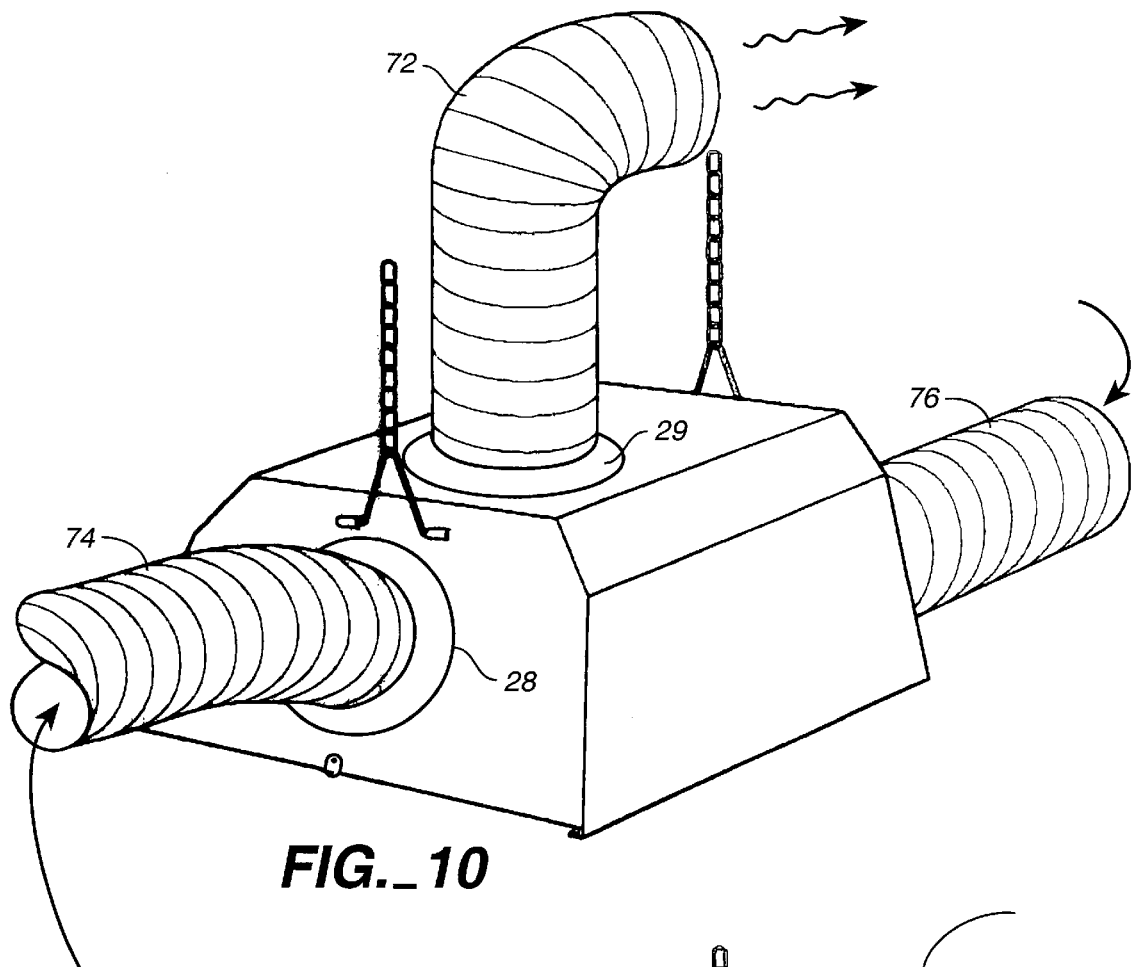
FIG._10
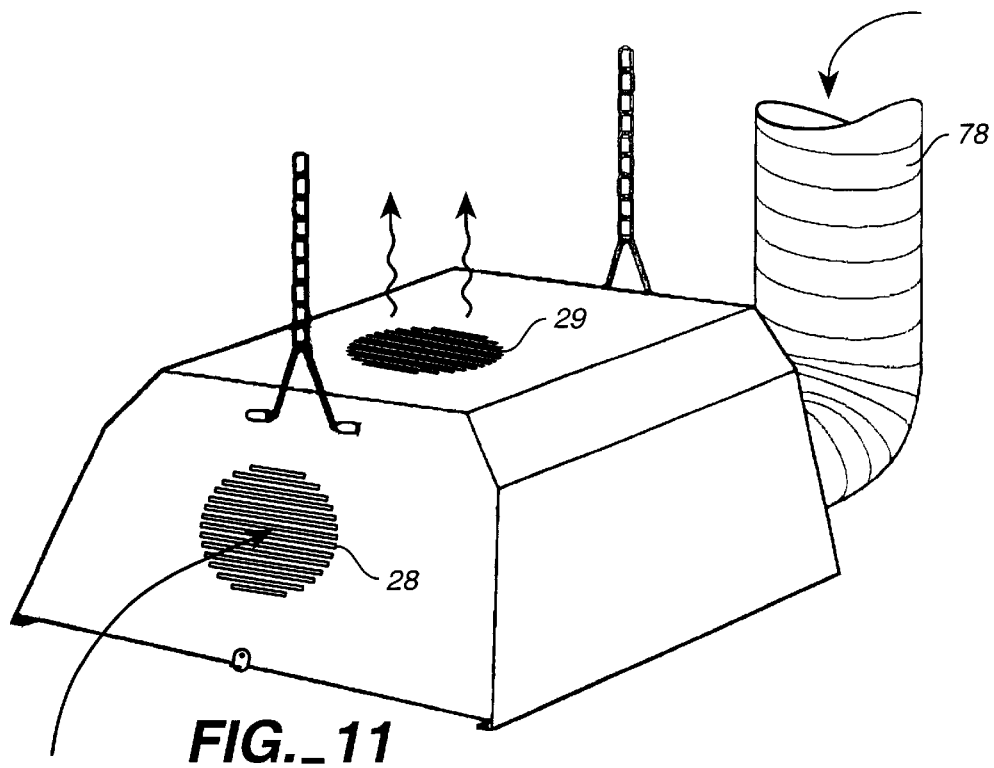
FIG._11

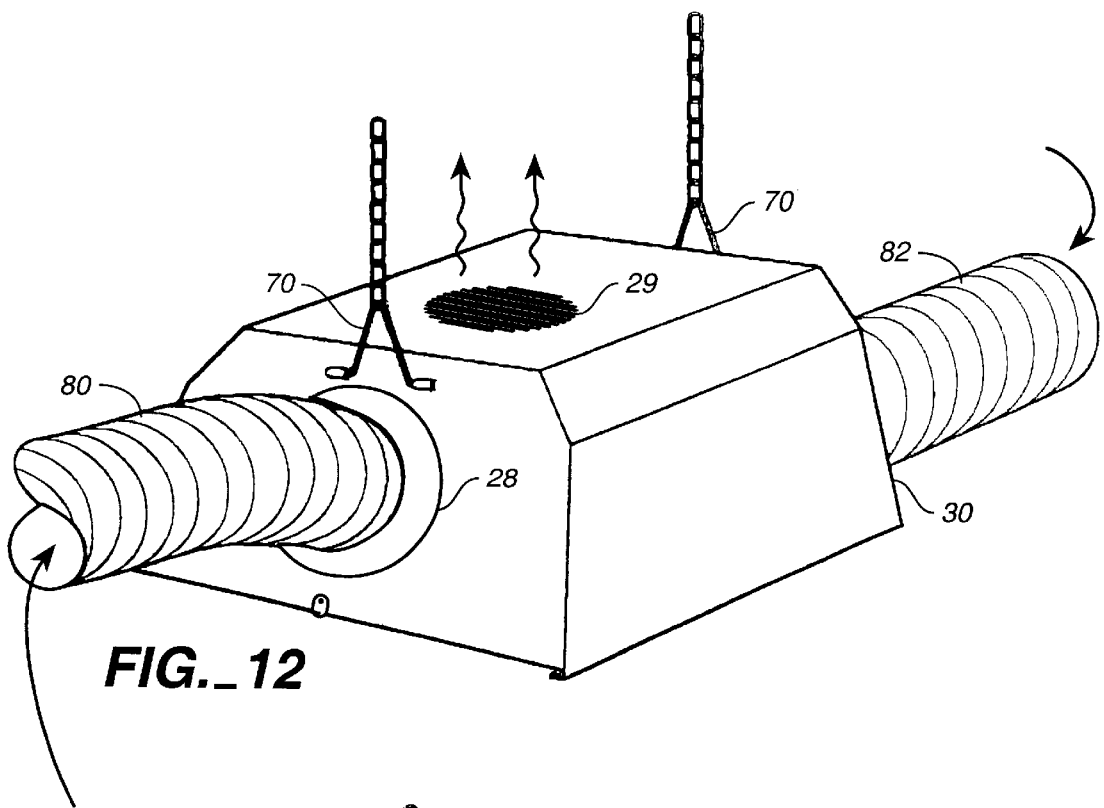
FIG._12
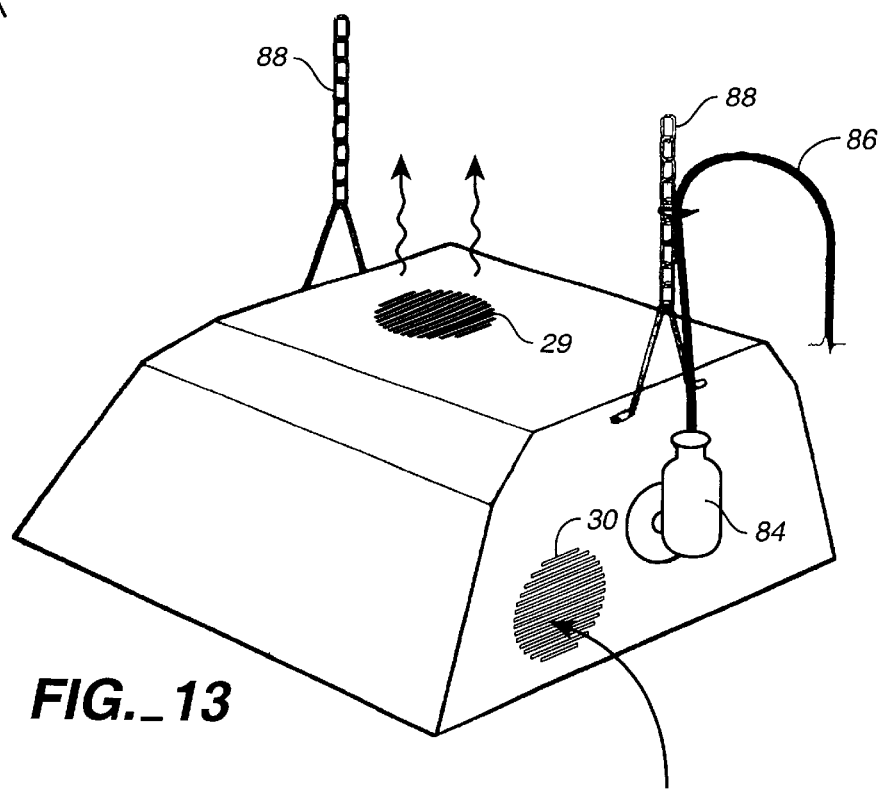
FIG._13

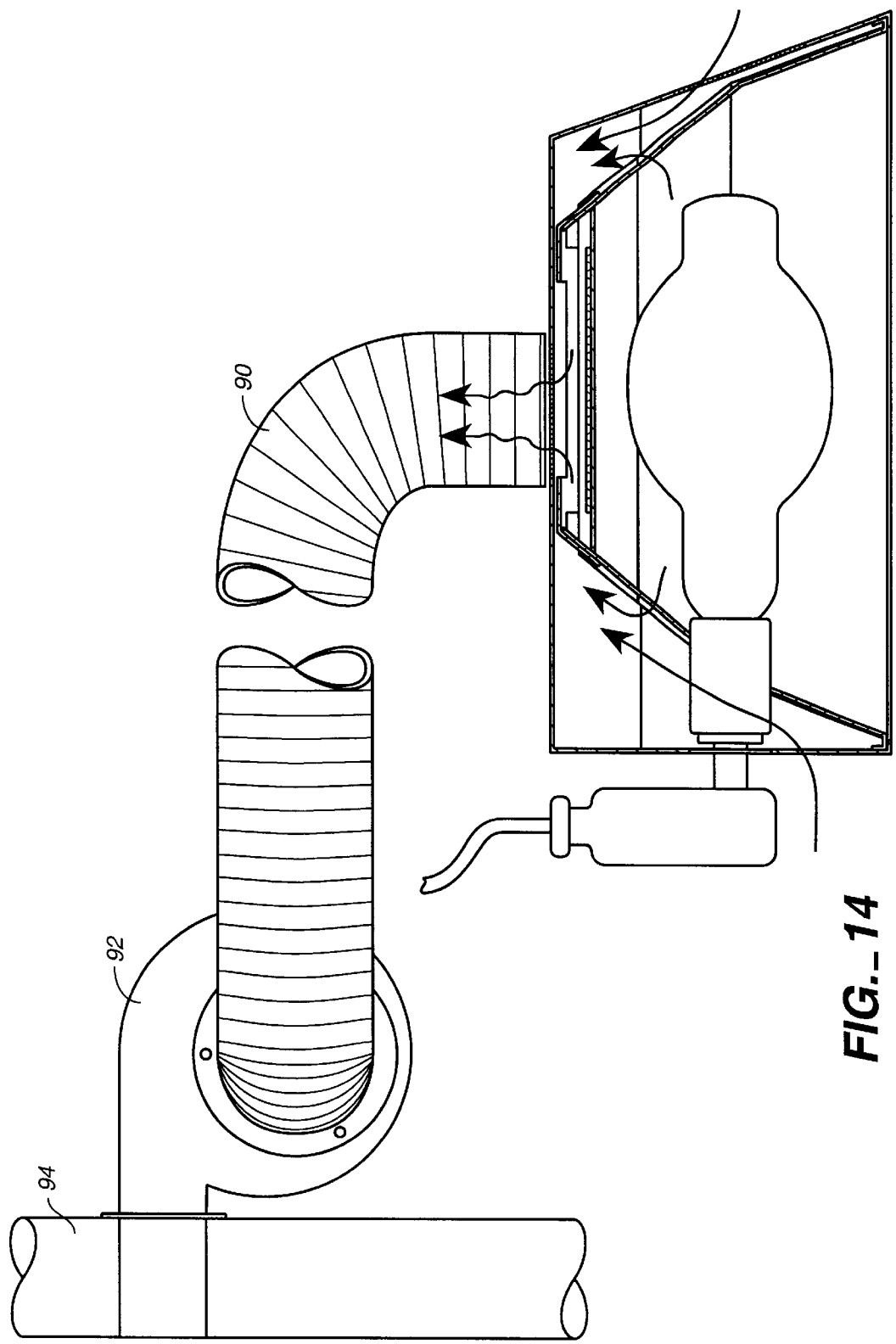

DOUBLE-WALLED GROW LIGHT HOUSING WITH AIR FLOW COOLING SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to horticultural and agricultural lighting systems for use in growing plants indoors, and more particularly to a double-walled grow light housing having an integral air flow cooling system that may be either active or passive.

DISCUSSION OF RELATED ART

Indoor hydroponic and soil-based plant growing systems have evolved to become indispensable tools in both horticulture and agriculture. Each system includes, as essential elements, plant nutrient media and containers for such, climate control, lighting, and hydration. Large or full-sized plants, and those indigenous to latitudes and growing regions characterized by intense sunlight, frequently require high intensity lights for optimal growing conditions. However, high intensity lights generate considerable heat that can create injurious high temperatures in the immediate vicinity of the plants under the high intensity light. Additionally, high intensity lights give rise to temperature differentials throughout a facility in which diverse species are grown under varying lighting conditions. Thus, when tight control over temperature in the growing environment is important, a cooling system may be employed to prevent a general rise in temperature in the growing facility. Facility-wide cooling systems may employed to this end, but such systems are costly and, if operated to cool plants under the high intensity lights, may result in temperatures below optimum in the areas around plants under low intensity lighting.

The needed solution to this problem is a dedicated cooling system integrated into the high intensity grow light itself, and therefore directed only to the area immediately surrounding the plant or plants under the high intensity light.

SUMMARY OF THE INVENTION

The double-walled grow light housing of the present invention solves the problem of locally generated heat from high intensity bulbs. The housing comprises three primary parts: an exterior shell, an inner specular insert, and an intermediate positioning device. The shell has a gambrel roof-type shape, including a flat top and sides, the sides defined by a steeply inclined lower portion and a less steeply inclined upper portion. The front and rear sides of the shell are flat, and the front side slopes gently rearward. The front and rear sides each have an air inlet. The top includes a hot air exhaust.

In addition to the exterior shell, the housing includes an inner specular insert and a specular positioning device interposed between the shell and the insert when assembled. The insert is configured with sides which, in cooperation with the shell, form air cooling spaces when assembled. Because the housing is intended for use with a high intensity bulb, the insert includes vents that allow for hot air to circulate away from the bulb and outwardly into the air cooling chambers. There the air mixes with cooler air drawn into the cooling chambers through air inlets in the exterior shell; after mixing the air is vented upwardly and out through a hot air exhaust in the shell.

BRIEF DESCRIPTION OF THE VARIOUS VIEWS OF THE DRAWINGS

FIG. 1 is an upper front perspective view of the doubled-walled grow light housing with air flow air cooling system of the present invention;

FIG. 2 is a lower rear perspective view of the light housing of FIG. 1, showing the interior structures and air flow ports;

FIG. 3 is an exploded perspective view showing the exterior housing shell, specular positioning device, and specular interior insert;

FIG. 4 is a detailed view of the glass retention tab which secures the glass covering or lens within the housing;

FIG. 5 is a bottom view of the doubled-walled grow light housing with air flow air cooling system of the present invention;

FIG. 6 is a cross-sectional rear view in elevation of the inventive grow light housing;

FIG. 7 is a left side cross-sectional view in elevation of the grow light housing;

FIG. 8 shows the inventive grow light housing suspended from hangers and employing a passive air flow system with unvented air inlets and an unvented outlet;

FIG. 9 shows the grow light housing employing a passive air flow system with a ducted air outlet;

FIG. 10 shows the grow light housing employing a passive air flow system with ducted air inlets and a ducted outlet;

FIG. 11 shows the grow light housing employing a passive air flow system and having both ducted and unducted air inlets, and at least one unducted air outlet;

FIG. 12 shows the grow light housing employing a passive air flow system and having ducted air inlets and an unducted air outlet;

FIG. 13 is a rear upper perspective view showing the grow light housing having an exterior electrical junction box and a power cord attached to a suspension chain; and FIG. 14 is a side view in elevation showing the grow light of FIG. 13 with an air outlet duct connected to an exhaust blower and thereafter ducted into a exhaust outlet, and further showing the air flow of the air flow cooling system.

DETAILED DESCRIPTION OF A PREFERRED EMBODIMENT

Referring to FIGS. 1 through 14, wherein like reference numerals refer to like components in the various views, FIG. 1 is an upper front perspective view of the doubled-walled grow light housing with air flow air cooling system of the present invention, generally denominated 10 herein. FIG. 2 is a lower rear perspective view of the light housing of FIG. 1, showing the interior structures and air flow ports, while FIG. 3 is an exploded perspective view showing the exterior housing shell, specular positioning device, and specular interior insert. FIG. 4 is a detailed view of the glass retention tab which secures the glass covering or lens within the housing. FIG. 5 is a bottom view of the grow light housing and FIG. 6 is a rear cross-sectional elevation view taken along section lines 6—6 as shown in FIG. 5. FIG. 7 is a left side cross-sectional view in elevation of the grow light housing as viewed along section lines 7—7 in FIG. 5.

These views collectively show that the housing 10 generally comprises an exterior housing shell 12, preferably sheet steel, having a gambrel roof-shape and including a flat top side 14 and two steeply inclined lower portions 16 and two less steeply inclined upper portions 18, the first lower shell portion and first upper shell portion defining the right side 20, and the second lower shell and upper shell portions defining the left side 22. The front side 24 and rear side 26 are preferably substantially flat, though front side 24 slopes gently rearward while rear side 26 is substantially vertical and perpendicular to top 14. Front and rear sides each include at least one slotted air inlet, 28 and 30. Sides 20 and 22 each terminate at their lower edges in an inwardly disposed flange 21, which functions to hold a glass lens or panel within the housing. Top side 14 includes a hot air outlet or exhaust 29, positioned substantially in the center of the top side, though plural outlets and non-centered positions may be employed.

FIG. 3 shows that the housing comprises three primary parts, including the exterior shell 12, a specular interior insert 31 captured within the exterior shell, and a specular positioning device 32 interposed between the shell 12 and insert 31 when assembled. The insert is preferably fabricated from aluminum and its interior surface portion 35 is highly polished and adapted for optimum specular reflection of full spectrum light.

Insert 31 has a geometrical configuration generally like shell 12, but more in the form of a mansard-shaped roof, with four sloped sides having differentially sloped portions. Its sides include three sloped portions 34, 36, and 38, the lower insert portions 34 being slightly spaced apart from the lower shell portions by an outwardly disposed flange 39 at its bottom edge. Additionally, each of the insert portions 34, 36 and 38, slant inwardly and at a less steep pitch than the sides of the shell so that the sides of the insert and the sides of the shell are spaced apart and define contiguous side air spaces to function as cooling chambers 40a, 40b, between the insert and the shell. Further, the inset front side 42 and insert rear side 44 each include a lower portion 46 and an upper portion 48 that slant inwardly from the front and rear sides, respectively, of shell 12, so that the front and rear sides of the insert are spaced apart from the front and rear sides of the shell and define front and rear interior cooling chambers 50a, 50b interior to each end of the housing. The upper portion 48 of the insert front and rear extends upwardly to substantially the top side of the shell thus functioning as a barrier that partitions the side air spaces 40a, 40b from the front and rear cooling chambers 50a, 50b, and therefore conducts rising warm air upwardly toward the hot air exhaust outlet.

The top surface 54 of insert 31 is V-shaped and positioning device 32, which has four L-shaped arms 56, and a slightly flexible central V-shaped portion which engages the crotch 58 of top surface 54 and biases insert 31 against flanges 21, thus providing tension between the shell and insert and a stable assembly of housing components. When insert 31 is positioned in shell 12 and positioning device 32 properly positioned between shell 12 and insert 31, the insert will snap in place.

Front side 24 extends downward a distance slightly higher than sides 20 and 22, and flange 21 is preferably broad enough to support a glass lens (or other transparent lamp cover), which may slide onto flange 21 and may then be secured by a rotatable eccentric clasp 60 pivotally connected to front side 24.

As may be readily appreciated by those with knowledge in the art, the light housing of the present invention facilitates the upward and outward flow of air heated by the light bulb 62, firstly through slotted warm air exhaust vents 52 in the front and rear sides of the specular insert 31, and then into cooling chambers 50a and 50b; there the air is mixed with air passively drawn into the cooling chambers through air inlets 28 and 30 and then ventilated upwardly through air exhaust cooling chamber 64 and ultimately into the surrounding atmosphere through out hot air exhaust vent 29.

FIGS. 8 through 14 show ducting variations for both passive and active air flow systems. When ducting is connected to either air inlet or the air outlet, it may be understood that an active air flow system may be connected to mechanically force air through the housing with a blower or fan.

FIG. 8 shows the inventive grow light housing suspended from hangers 70 and employing a passive air flow system with unvented air inlets and an unvented outlet. FIG. 9 shows the grow light housing employing a passive air flow system with a duct 72 connected to the hot air exhaust outlet. FIG. 10 shows the grow light housing employing either a passive or an active air flow system with ducts 74, 76 at each air inlet and a duct 72 at the hot air exhaust outlet 29. FIG. 11 shows the grow light housing employing either a passive air flow system or a combination passive and active system, wherein the front side air inlet 28 has a connected duct 78, the rear side air inlet 30 is exposed, and the hot air exhaust outlet 29 is exposed. FIG. 12 shows the grow light housing employing either a passive or an active air flow system and having ducts 80, 82 at each air inlet and an unducted hot air exhaust outlet 29. FIG. 13 is a rear upper perspective view showing the grow light housing having an exterior electrical junction box 84 and a power cord 86 attached to a suspension chain 88.

FIG. 14 is a side view in elevation showing the inventive apparatus with an air outlet duct 90 connected to an exhaust blower 92 and thereafter ducted into a exhaust outlet 96, and further showing the air flow of the air flow cooling system.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A grow light adapted for use with high intensity light bulbs, said grow light comprising:

an exterior shell having an air inlet and a hot air exhaust outlet, wherein said shell has a substantially flat top side, a front side and a rear side, a first and second inclined lower portion and a first and second inclined upper portion, said first and second inclined portions less steeply inclined than said first and second lower inclined portions, said first lower portion and first upper portion defining a right side and said second lower portion and second upper portion defining a left side; and a specular insert captured within said shell and having sides spaced apart from said shell so as to form a double-walled housing defining at least one air cooling chamber between said shell and said specular insert, said specular insert having at least one vent through which air heated by the high intensity light passes into said at least one cooling chamber and thereafter outwardly through said hot air exhaust outlet.

2. A grow light as in claim 1, wherein said front side and said rear side are substantially flat, and wherein said front side slopes gently rearward toward said rear side, and wherein said rear side is substantially perpendicular to said top side.

3. A grow light as in claim 1, wherein said specular insert has sides that slant inwardly and a less steep pitch said sides of said shell so that said sides of said specular insert and said sides of said shell are spaced apart and define contiguous side cooling chambers between said insert and said shell.

4. A grow light as in claim 3, wherein said specular insert has a plurality of differentially sloped portions, including first and second lower insert portions each having a bottom edge and which are spaced apart from said first and second lower shell portions by an outwardly disposed flange at said bottom edge.

5. A grow light as in claim 4, wherein said front and rear sides each include at least one slotted air inlet.

6. A grow light as in claim 1, wherein said first and second lower portions have lower edges that terminate in an inwardly disposed flange for holding a glass lens or panel within said housing.

7. A grow light as in claim 1, wherein said top side includes a hot air outlet.

8. A grow light as in claim 7 wherein said hot air outlet is positioned in substantially the center of said top side.

9. A grow light as in claim 1 wherein said specular insert includes a front side and a rear side, each including a lower portion and an upper portion that slant inwardly from said shell front and rear sides, respectively, so that the front and rear sides of the insert are spaced apart from said shell front and rear sides to define front and rear interior cooling chambers.

10. A grow light as in claim 9 wherein said upper portions of said insert front and rear sides extend upwardly to substantially said top side of said shell to partition said side air spaces from said front and rear cooling chambers, and wherein said insert front and rear upper portions further include slotted warm air exhaust vents that bring said cooling chamber air spaces into fluid communication with air heated by the high intensity light bulb.

* * * * *